Oct. 8, 1968   R. GOTTSCHALD   3,404,909
SEAL FOR THE JOINT PIN OF UNIVERSALLY MOVABLE JOINTS
Filed Oct. 21, 1965
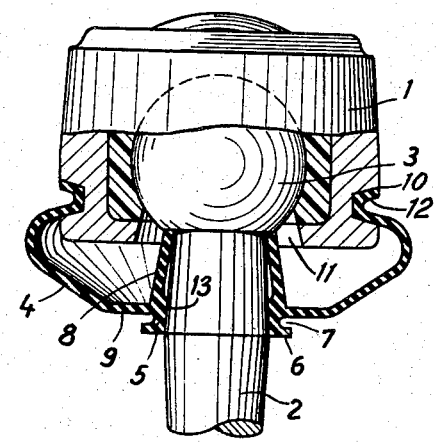
Inventor
RUDOLF GOTTSCHALD
BY
Kenyon & Kenyon
ATTORNEYS

United States Patent Office 3,404,909
Patented Oct. 8, 1968

3,404,909
SEAL FOR THE JOINT PIN OF UNIVERSALLY
MOVABLE JOINTS
Rudolf Gottschald, Osterath, Germany, assignor to
A. Ehrenreich & Cie.
Filed Oct. 21, 1965, Ser. No. 499,863
Claims priority, application Germany, Sept. 17, 1965,
E 30,114
3 Claims. (Cl. 287—87)

ABSTRACT OF THE DISCLOSURE

The subject invention relates to the seal for ball and socket type universal joints. Basically, the seal is of the bellows type and is provided with a peripheral collar designed to fit in a peripheral groove on the joint case, and an axially disposed collar arranged to afford passage of the joint pin therethrough. In addition, the design includes an external flange integral with the seal located adjacent the axially disposed collar arranged in such a manner that an annular external recess is formed in which a tension ring can be inserted to impose a positive force on the collar to insure positive sealing contact between the collar interior and the joint pin. Also, formed integrally on the seal is a sleeve which extends from the axially disposed collar to the ball of the joint and which is designed to facilitate sliding movement of the pin with respect to it. To achieve this result, the internal diameter of the sleeve is sized larger than the outside diameter of the pin at the point nearest the collar with the internal diameter of the sleeve progressively decreasing in size as it approaches its terminus wherein the sleeve interior engages the joint pin and the sleeve exterior engages the ball in sealing relationship.

---

My invention relates to a bellows seal for ball and socket joints. More particularly, the invention relates to a bellows seal intended to close the joint case aperture through which the joint pin projects.

The seal of the present invention is directed to effecting as complete a seal as possible and to preventing the collar which surrounds the joint pin from gliding toward the ball head which gliding would not only be detrimental to the desirable tightness of the seal but might also result in damage to the sealing bellows in the case of large angular deflections.

With sealing caps in the form of a bell, it is presently known to provide a sleeve at the periphery of the seal opening arranged for the passage of the joint pin wherein the sleeve surrounds the joint pin in sealing relationship and projects toward the ball head. However, these sleeves are snugly fitted to the joint pin and tightly surround the joint pin. In these cases the sleeve has to meet sealing requirements and improve the enclosure of the joint pin. Therefore relative movement between the seal and the joint pin can not exist since the seal is following the movements of the joint pin.

Seals in the form of bellows are not able to follow the rotary movements of the joint pin due to their being fixed to the joint case, and are liable to be deformed in the case of angular deflections of the joint pin. Therefore, it is necessary that the joint pin be able to glide in the opening of the bellows through which the said pin passes.

The primary object of the invention is to provide a seal in the form of bellows of the type mentioned above which, without any prejudice to the gliding ability of the joint pin in the opening of the bellows through which the said pin passes is protected against sliding off towards the joint case and towards the ball head.

According to the invention the said problem has been solved in such a way that the side of the rim of the bellows opening through which the joint pin passes and which side is facing the ball head is provided with a sleeve which projects towards the ball head until or almost until contacting the same and is freely moving with relation to the joint pin.

Due to this feature the bellows are secured against sliding toward the joint case and the ball head without impeding the gliding ability of the joint pin in the opening of the bellows which is passed by the joint pin.

In particular, the sleeve may extend from the opening of the bellows which surrounds the pin shaft with a sealing effect, to the ball head or to a point adjacent to the ball head. This is favorable in that it will not be possible for any lubricant or similar matter to enter the sleeve from the ball head side, since the sleeve extremity which is facing the head is in contact therewith.

With the invention it will be possible that this bellows have a flat form similar to two plates having the open sides facing each other and the rims of which are in contact with each other, so that it will be possible to employ the seal even at rather narrow locations and to provide a comparatively large diameter thereby facilitating the elasticity of the seal and furnishing means to possibly supply lubricants thereto.

It is preferable to flatten the outer surface of the bellows outer lip which forms the opening for the passage of the joint pin in order to obtain a special elasticity at this point.

The drawing is an example of a construction according to the invention and shows a vertical section of a seal which is fixed to a ball joint.

The ball joint consists of the joint case 1 a universally moveable joint pin 2 terminating in a ball head 3 which is carried in the joint case 1. The seal 4 is provided for the opening 11 where the joint pin 2 leaves the joint case 1.

The seal 4 has the form of bellows and has, in the example shown as a preferred construction, a comparatively small height and a comparatively large diameter. The said seal 4 has substantially the form of two plates the open sides of which are facing each other and the rims of which are in contact with each other. The peripheral collar 12 of the seal 4 facing the joint case 1 is fixed in a peripheral groove 10 in the outside of the joint case 1 in a way which is already known, such as, by means of a wire ring which is not shown in the drawing.

The joint pin 2 through the axial collar 13 in the bellows seal 4 which is provided with a hub like outer lip 5. The lip 5 has an outer flange 6 for the formation of a peripheral groove 7 which is intended to receive a spring ring or similar device, not shown in the drawing, which draws the lip 5 against the pin 2 and maintains the joint pin 2 in gliding relationship with the interior of the axial collar 13.

Naturally, the provision of a spring or tension ring to draw the interior of the opening against the pin is not absolutely necessary.

At the side of the opening facing the ball head 3 a sleeve 8 integrally formed with the seal 4 projects toward the ball head 3 until contacting the same. The inner surface of the sleeve 8 is not in contact with the ball head 3 but covers the joint pin 2 from the passage opening of the bellows seal 4 to the ball head 3.

The outer surface 9 of the bellows which surrounds the lip 5 is flattened.

It is preferable to construct the bellows in such a way that it will be located as nearly as possible to the joint case 1, i.e. that it will stand off from the joint case 1 as little as possible, resulting in the condition that the bellows need not follow major outward bendings.

I claim:
1. In the bellows-like seal for the joint pin orifice of a universal ball and socket joint having an annular peripheral collar on one end secured in the peripheral groove on the joint case and an annular axial collar on its opposite end through which the joint pin passes, the improvement which comprises:
   a frusto-conical sleeve integrally formed with the axial collar and extending along the pin and radially spaced from the pin from the axial collar through which the joint pin passes to the juncture of the pin and ball, the sleeve thus being sized to slidably accommodate the joint pin and to extend to the joint ball in sealing engagement therewith.

2. A bellows-like seal as described in claim 1 wherein an external radial flange is integrally formed on the end of the axial collar through which the joint pin passes.

3. A bellows-like seal described in claim 2 wherein the interior of the sleeve is contoured with an internal shoulder that maintains the internal wall of the sleeve remote from the pin surface with the sleeve diameter structured to progressively reduce the remoteness in distance between the wall of the sleeve and the pin as the sleeve extends in the direction approaching the ball until it terminates in sealing relationship at the ball and engages the joint pin at that point.

References Cited

UNITED STATES PATENTS

| | | |
|---|---|---|
| 2,752,180 | 6/1956 | Vogt. |
| 2,974,975 | 3/1961 | Thomas. |
| 3,052,477 | 9/1962 | Parker. |
| 3,155,407 | 11/1964 | Gottschald. |
| 3,260,543 | 7/1966 | Henry-Biabaud. |

FOREIGN PATENTS

| | | |
|---|---|---|
| 662,676 | 12/1951 | Great Britain. |

CARL W. TOMLIN, *Primary Examiner.*

ANDREW V. KUNDRAT, *Assistant Examiner.*